United States Patent [19]
Beck et al.

[11] 3,873,477
[45] Mar. 25, 1975

[54] METALLIC SALTS OF TETRAZOLES USED AS BLOWING AND INTUMESCENT AGENTS FOR THERMOPLASTIC POLYMERS

[75] Inventors: Walter Beck, Bedford; John C. Blackwood, Melrose, both of Mass.

[73] Assignee: Stepan Chemical Company (National Polychemicals Div.), Wilmington, Mass.

[22] Filed: Dec. 17, 1973

[21] Appl. No.: 425,068

[52] U.S. Cl......... 260/2.5 R, 106/122, 260/2.5 HA, 260/2.5 P, 260/2.5 E, 260/2.5 N, 260/45.75 R, 260/299, 260/DIG. 24

[51] Int. Cl. ...... C08g 53/10, C08f 47/10, C08j 1/20
[58] Field of Search......... 260/2.5 R, 2.5 H, 2.5 HA

[56] References Cited
UNITED STATES PATENTS
3,442,829   5/1969   Moore et al. .................... 260/2.5 H

*Primary Examiner*—Morton Foelak
*Attorney, Agent, or Firm*—Richard P. Crowley

[57] ABSTRACT

Tetrazole metal salts of zinc, barium, calcium, lead and aluminum are useful as blowing agents in high-temperature processing polymers, such as polycarbonate and polysulfone resins.

18 Claims, No Drawings

METALLIC SALTS OF TETRAZOLES USED AS BLOWING AND INTUMESCENT AGENTS FOR THERMOPLASTIC POLYMERS

BACKGROUND OF THE INVENTION

A number of chemical compounds, when heated to a particular temperature and temperature range, decompose to evolve gaseous products, such as ammonia, carbon dioxide, nitrogen and other gases and mixtures thereof. Due to a variety of problems, there are only a very small number of commercially accepted blowing agents which are useful to provide cellular foam products. Some compounds are unacceptable due to toxic residual products or color, while others do not decompose at an acceptable decomposition temperature or within an acceptable decomposition temperature range for use as blowing agents in gas-expandable thermoplastics. Other compounds are unacceptable, since the gases involved, such as carbon dioxide, ammonia or water vapor, weaken the chemical bonds of the polymer in which they are incorporated or otherwise are detrimental to the expandable polymer. Certain blowing agents are limited in use where the residual by-products are corrosive or the gases are corrosive which would restrict their use, for example, in injection molding of structural polymers by corrosion of a metallic mold, such as in beryllium copper molds.

The generally acceptable blowing agents for incorporation into gas-expandable polymers for the preparation of polymeric foams are compounds such as azodicarbonamide and oxybis(benzenesulfonyl hydrazide). These blowing agents are acceptable for use in elastomeric materials or polyvinyl chloride, but tend to hydrolyze in the presence of water, and, importantly, their decomposition temperatures are too low for their effective incorporation into certain polymers as blowing agents. Most, if not all, of the commercially used and known blowing agents are unsatisfactory as blowing agents in polymeric materials which have a high-processing temperature, such as temperatures above about 350°F. Such blowing agents tend to decompose prematurely, and, therefore, to be ineffectual blowing agents. The decomposition of a blowing agent used in a high-temperature processing polymer should occur within the polymer-processing temperature range and prior to the completion of the processing of the polymer to produce a foam product of uniform density. High-temperature processing polymers are typically processed in an extruder and injected into a mold which is heated to produce a rigid cellular product.

One product useful as a high-temperature processing blowing agent is 5-phenyl tetrazole which has a decomposition temperature in the range of about 450° to 480°F, and, therefore, provides some limited use as a blowing agent in high-temperature processing polymers. This blowing agent is described in U.S. Pat. No. 3,442,829, patented May 6, 1969, which is hereby incorporated by reference in its entirety. The blowing agent 5-phenyl tetrazole has a decomposition temperature which is only marginally satisfactory for many high-temperature processing polymers; that is, those having a processing temperature above 500°F.

Although all blowing agents might be assumed to have utility as a foam-generating material in synthetic polymeric fibers when used in fabrics exposed to flames or heat, this has not been the case. The foaming agents heretofore available decompose at too low a temperature for inclusion in polymeric textile fibers. The processing temperatures of these polymers are higher than the decomposition temperatures of the foaming agents, and the material decomposes during processing; e.g., fiber extrusion, leaving little, if any, blowing agent available in the fiber to serve as an intumescent agent when the fabrics are later exposed to heat.

To be useful as an intumescent agent, a blowing agent must also withstand weathering and repeated washing without loss of the agent by reaction or extraction.

Thus, presently commercially available blowing agents are not useful as intumescent agents; some because their decomposition temperature is too low for inclusion undecomposed into the fiber; some because they hydrolyze in the presence of water and release gas when the polymer is not in a condition for foaming; and others because they are water-soluble or otherwise soluble in the solutions used for washing, so that they are leached out of the fiber during water contact or laundering.

Of the existing commercial foaming agents, 5-phenyl tetrazole has a decomposition temperature sufficiently high so that it can be incorporated into some polymeric textile fibers during extrusion, or solvent-spinning of the polymer into fiber form, although a still higher decomposition temperature would increase its utility significantly as a useful intumescent agent. It has been found that 5-phenyl tetrazole performs satisfactorily as an intumescent agent when the fabric is exposed to heat, foaming the polymer and forming an insulating foam-char-type layer. However, 5-phenyl tetrazole is not acceptable commercially because of its lack of permanence, since it is leached out during the wash cycles in alkaline laundry solutions.

A similar problem exists when blowing agents are used in paints as intumescent agents. The temperature of incorporation is no problem, as the polymeric material is incorporated in the formulations by solution, and not by melting or extrusion as for fibers. The decomposition temperature must be high enough so that the material does not decompose prematurely. A greater problem, however, is the stability and permanence of the additive in the paint, particularly in aqueous latex paints. The blowing agent used in paints must not be broken down in the formulation by hydrolysis or reaction with the other components, and it must not be leached out by weathering or washing.

Accordingly, it is desirable to provide compounds useful as blowing and/or intumescent agents which have a higher decomposition temperature than those chemical blowing agents presently available, and which have other desirable properties, so that such compounds may be used in polymers, and particularly in high-temperature processing polymers.

SUMMARY OF THE INVENTION

Our invention relates to novel and useful metallic salts of tetrazoles and their use as blowing agents and/or intumescent agents. In particular, our invention concerns certain water-insoluble polycationic heavy metal salts of 5-phenyl tetrazole and their use as blowing agents in high-temperature processing polymers to prepare synthetic polymers, and as intumescent agents in polymers employed to prepare flame-retardant synthetic textile fibers and in other applications, such as intumescent paints where an intumescent agent is usefully employed.

We have found that certain polycationic metal salts of 5-aryl tetrazole can be prepared, and have a high decomposition temperature of greater than 500°F and are useful as blowing agents and also as intumescent agents. The 5-aryl tetrazoles comprise both substituted and unsubstituted mono and bis tetrazoles. The metal salt cations of our compounds include barium, calcium, zinc, lead and aluminum.

The tetrazole salt compounds of our invention may be represented by the formula:

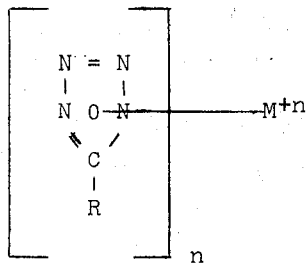

wherein R is an aryl radical, n is a number 2 or 3 and M is a metal cation of barium, calcium, zinc, lead and aluminum.

The preferred compounds are where R is a phenyl, naphthyl or benzyl radical or a substituted phenyl or benzyl radical where the substituents are alkyl radicals; e.g., $C_1$-$C_4$ like methyl, ethyl and propyl radicals, or halogens, preferably chloride or bromide radicals, or a 5-tetrazoyl radical to form a bis tetrazole.

The preferred and most useful 5-phenyl tetrazoles of our invention are the metal salts of the mono-unsubstituted 5-phenyl tetrazoles or di-unsubstituted 5-phenyl tetrazoles. Our compounds may have each valence bond of the metal polycation bonded separately to each of the 4 position of separate tetrazole rings; i.e., two for barium, lead, zinc, cadmium, and three for aluminum, or the metal cations may have a valence bond with a bis tetrazole to form an intramolecular ring structure, or the trivalent metal cations be bonded to a bis tetrazole in an intraring structure and to a separate tetrazole ring.

Our unsubstituted 5-phenyl tetrazole metallic salts of lead, aluminum, zinc, barium and calcium are particularly useful as blowing agents in high-temperature processing polymers, and most particularly, polysulfones and polycarbonates, since the processing temperature of such compounds is greater than about 500°F and greater than the minimum of the decomposition temperature of 5-phenyl tetrazole. While 5-phenyl tetrazole releases pure nitrogen as do the metallic salts of our invention, and can be used with some high-melting polymers, such as nylon, its decomposition temperature, however, is often so close to the working temperature of other high-temperature processing polymers that cell characteristics of the molded parts are inferior due to the overexpansion of the released gas. The 5-phenyl tetrazole is not wholly satisfactory as a blowing agent with high-temperature processing polymers having a processing temperature in the range of 550° to 600°F. In particular, the decomposition temperature of 5-phenyl tetrazole is quite close to the extrusion or compounding temperature for many polycarbonate resins, and is not entirely satisfactory as a blowing agent in such resins, since foamable pellets cannot be readily prepared.

Our metallic salts of 5-phenyl tetrazoles permit use in polycarbonate, polysulfone and other resins under normal compounding conditions of the resin, such as extruding, and subsequent expansion of the polymer after such working without premature gas loss. The higher decomposition temperatures of our metallic salts of 5-phenyl tetrazole permit the process of high-temperature polymers in the production of foam materials, such as polycarbonate foam, for example, by rotational casting, extruding and molding operations. Other commercial blowing agents besides 5-phenyl tetrazole, besides their lower decomposition temperature, all provide reactive gases on decomposition. Azodicarbonamide provides ammonia and carbon dioxide in addition to nitrogen, while oxybis(benzenesulfonyl hydrazide) decomposes to water, ammonia and carbon monoxide. Dinitrosopentamethylenetetramine provides methylamine, while sulfonyl semicarbazides give off carbon dioxide, carbon monoxide and ammonia. The presence of these reactive gases given off often have a detrimental affect on the physical properties of the polymer being foamed, and further, can be corrosive to the processing equipment used, such as reactivity of ammonia with metal dies. Reactive gases formed in the decomposition of these blowing agents are also very detrimental to the physical properties of polycarbonate resins.

The metallic salt tetrazoles may also be usefully employed as intumescent agents in synthetic polymers or as blowing agents in polymers wherein the polymers come in contact with water or alkaline solutions. For example, our metallic salt tetrazoles may be incorporated into polymers employed to prepare flame-retardant synthetic textile fibers, and such additives are useful as intumescent agents which serve to increase the flame resistance of the textile materials in which the polymeric fibers are so employed. The fibers, when heated to a high temperature, such as when exposed to open-flame or high-heat conditions, decompose to form a foam and to provide a voluminous char-type material which aids in insulating the material from direct heat. In addition, on decomposition of the agent, inert nitrogen gas is provided which is said to aid in retarding the rate of flame propagation in the burning fibers. Moreover, the stability of the metallic salts of 5-phenyl tetrazole leads to increased permanence as they are not destroyed by weathering and not readily leached out during the washing cycles.

We have discovered that the employment of 5-phenyl tetrazole alone for use as a blowing agent or an intumescent additive in polymers in contact with water or alkaline or acidic aqueous solutions is not practical or useful, not only because of the lower decomposition temperature, but further, the 5-phenyl tetrazole reacts with the alkaline detergents typically employed in laundering operations to form a water-soluble salt, such as a sodium or potassium salt. The water-soluble 5-phenyl tetrazole salt so formed is leached out of the polymer or fiber textile material when placed in contact with water, such as in laundering or washing cycles, such that the material then loses its ability to foam or is substantially or wholly reduced in flame resistance.

Other commercial blowing agents which are water-insoluble, however, tend to decompose at much lower and unsatisfactory temperatures for use as intumescent agents, and, further, often tend to hydrolyze in the presence of water, such as azodicarbonamide and oxybis(benzenesulfonyl hydrazide). The metal salts of sodium, potassium, magnesium and ammonium of 5-phenyl tetrazoles or unsubstituted 5-phenyl tetrazoles have been found to be water-soluble which precludes their use as intumescent agents in washable fabrics or paints or as blowing agents in gas-expandable polymers which might be placed in contact with water prior to decomposition. The cadmium, antimony and copper salts of the unsubstituted mono 5-phenyl tetrazole, although insoluble materials, do not decompose to yield nitrogen gas, and cannot be used as blowing agents in high-temperature processing polymers. Rather, such metallic salt compounds at high temperatures break down to yield organic decomposition products other than essentially pure nitrogen as the salts of our invention.

Tetrazoles and certain salts of 5-phenyl tetrazole, such as sodium, potassium, beryllium, platinum or palladium salts, have been indicated to be useful as desensitizing agents in the photographic field (see French Patent No. 2,020,524; U.S. Pat. No. 3,592,656; J. Chemical Society 57, 232–234 (54); and Bull. Soc. Sci. Phot. Japan, No. 3, 14–25 (1953)). Certain cyanoalkenyltetrazole metal salts have also been suggested as useful as propellants (see U.S. Pat. No. 3,338,915). The polycationic metallic salts of 5-phenyl tetrazoles of our invention have many and distinct and important advantages over presently known and used blowing agents in that such salts are relatively water-insoluble, decompose at temperatures above about 500°F; e.g., 500° to 700°F, to give, on decomposition, essentially pure nitrogen gas, and are useful as a blowing agent in polycarbonate and other resins for the preparation of structural and other rigid foam products.

The metallic salts of our invention may be prepared from the water-soluble salts of tetrazoles by double decomposition reactions. The general formula for tetrazoles is:

$$n_1 Y(Z) + MX_n \rightarrow M(Z)_n + nYX$$

Where:
Y = Na+, K+, NH$_4$+ or any other cation that forms a soluble salt.
M = Ca, Zn, Ba, Al, SB, Cd or other cation that forms a water-insoluble salt with tetrazoles.
Z = a tetrazole.
$n_1 = n$ = the number equal to the valence of M.
X = halogen.

Y may be any cation that forms a water-soluble salt, although the sodium salt is preferred because of its ready availability. M may be any cation which forms an insoluble salt with tetrazoles, although the Ca, Ba and Zn cations are preferred. X preferably is the chloride ion, although the bromide and iodide ions may be used. In fact, X may be any anion as long as it forms a soluble salt with the cation in question.

In preparing these metal salts, it is essential that purified tetrazoles be used; that is, tetrazoles that are essentially free of the azide ion or of hydrazoic acid. The presence of azide ion or of hydrazoic acid may lead to the formation of explosive metal azides.

A typical process for the preparation of a metal salt is represented by:

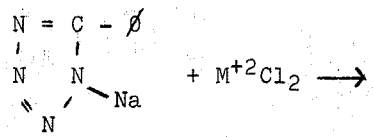
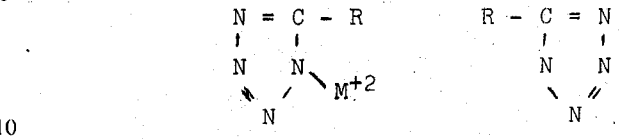

where M$^{+2}$ is Ba, Ca or Zn.

Other salt compounds of my invention include intrarring molecular formulas, such as:

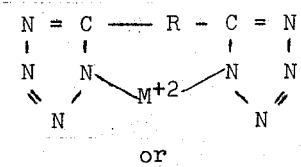

or

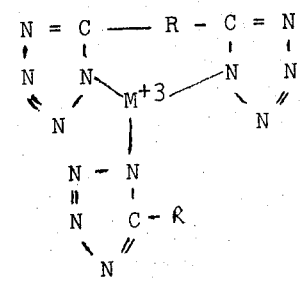

particularly where R is a benzyl or phenyl radical or a C$_1$–C$_4$ methylene radical.

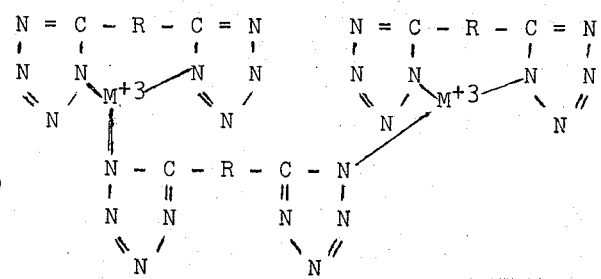

(Intraring formula with bis tetrazoles) wherein R is an organic radical, such as a C$_1$–C$_4$ alkylene or phenyl radical, and M$^{+3}$ is aluminum.

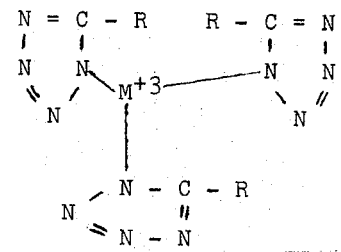

(Mono tetrazole formula with travalent metal) wherein R is a phenyl radical.

DESCRIPTION OF THE EMBODIMENTS

The preparation and the use of the metal salts of our invention will be set forth for the purpose of illustration in the following examples.

The preparation of barium 5-phenyl tetrazole was carried out by the use of 5-phenyl tetrazole (294g)

which was added to a solution of 80g sodium hydroxide in ½ liter of water. When the 5-phenyl tetrazole is all dissolved, a solution of 208g of barium chloride is added slowly with stirring. The white solid which forms is filtered and washed with water to remove chlorides and dried at 110°C, and is identified as a barium 5-phenyl tetrazole. By the same process, the metal salts of 5-phenyl tetrazole of zinc and cadmium was prepared and tested for use as a blowing agent.

It was found by test that the decomposition temperature and the nitrogen gas release of such compounds were as follows:

| Compound | Decomposition temperature in air | Nitrogen gas release in ml per gram |
| --- | --- | --- |
| Barium 5-phenyl tetrazole | 707°F | 137 |
| Calcium 5-phenyl tetrazole | 662°F | 177 |
| Zinc 5-phenyl tetrazole | 734°F | 165 |
| Aluminum 5-phenyl tetrazole | 509°F | 189 |

The above metal salts were all relatively water-insoluble and suitable for use in water-washable polymeric textile fibers.

By the same method described, the salts of copper +1, +2, ion, cadmium, iron +2, +3 and antimony were prepared, tested and found not to decompose as blowing agents. In addition, water-soluble salts of sodium, potassium, ammonium and magnesium were also made by the same procedure, with the exception of the solid-recovery procedure. In the preparation of the water-soluble salts, a 50% alcohol solution was employed and the salts prepared were washed with the same solvent. The water-soluble salts so prepared were tested and found not to be suitable for use as blowing agents in high-temperature processing polymers.

Our metallic salts of 5-phenyl tetrazoles may be employed by incorporating a small, but effective, blowing or intumescent amount of the material into a gas-expandable polymer. The amount of such material will vary, depending on the polymer foam density desired and other processing and temperature factors which are well known. However, typically, our compounds may be employed by incorporating from about 0.1 to about 15% by weight of the compound as a blowing agent; for example, from about 0.2 to 5.0%, such as in preparing rigid or structural foam polycarbonate resin products. Our blowing agents may be employed in various particle sizes, and alone or in combination with other blowing agents, stabilizers, antioxidants, fillers, plasticizers, cross-linking agents, dyes, pigments, carbon and other additives employed in polymeric compositions or in polymers useful in providing synthetic textile fibers and synthetic textile materials.

Our compounds are particularly useful when employed in high-temperature processing polymers; that is, polymers requiring a processing temperature of greater than about 400°F; for example, 500° to 800°F. Typical high-temperature processing polymers include, but are not limited to, polyacryl ether, polyphenylene sulfide, poly-p-oxybenzoate, polycarbonate, polysulfone, polysulfonate, polyamides such as nylon and particularly those polymers where the softening or extruding point is too high for the employment of 5-phenyl tetrazole alone as a foaming agent, such as, for example, foamable pellets of the aforementioned polymers. If desired and where suitable, additives may be employed to lower the decomposition temperature of our metal salt compounds, and such compounds may then be usefully employed in polymers having a lower processing temperature than described, such as high-impact polystyrene, polypropylene, polyethylene oxides, polyphenylene oxides and the like, like VALOX, an engineering-type thermoplastic polyester resin, a trademark of General Electric Company, or other gas-expandable polymers.

For example, our metallic salts of 5-phenyl tetrazole may be admixed with a polycarbonate homopolymer in a Banbury mixer, and the mixed mass milled into a large sheet or other form and subsequently processed into pellets. The polycarbonate homopolymer containing our blowing agent may then be placed or extruded into a multicavity mold and preheated to a temperature above the blowing temperature of the blowing agent for a period of time to produce a rigid structural foam polycarbonate product; for example, having a density range from about 0.6 to 1.0. Since no reactive gases, other than nitrogen gas, are decomposed in the process, no detrimental affects on the polycarbonate foam product are obtained.

High-temperature processing polymer foam products are also prepared by using our gas-expandable polymeric polymers by casting, molding or injection-molding, such as, for example, by preparing the products by heating the gas-expandable polymer during the injection-molding of the polymer with an injection machine at a temperature above the compounding temperature of the product; for example, 550° to 750°F.

When our compounds are employed solely as intumescent agents, the compounds may be incorporated into any gas-expandable material, but particularly are useful in polymeric materials employed to produce a textile fiber which may subsequently be fabricated into a synthetic textile fabric, such as wearing apparel, tufted and woven rug materials, drapes, coverings, wallpaper, automobile seat covers or the like, wherein increasing the flame resistance of the polymer is of some importance. Typical polymers employed for example in synthetic textiles in which our metallic salts of tetrazole may be employed as an additive would include polyamides, such as nylon; cellulosic resins, such as cellulose acetate; polyester resins, acrylics alone or in combination; polyolefins, like polyethylene, polypropylene; and other thermoplastic and elastomeric gas-expandable materials. When employed as an intumescent agent, the material is fabricated with an intumescent additive amount; e.g., 0.05 to 8.0% weight, of the compound which will vary, depending upon the particular use of the ultimate product. Typically, the polymer should also contain a flame-retardant additive in an amount to prevent or retard flames, such as a phosphate, a halogen compound, antimony oxide, a borate, hydrated aluminum or other flame-retardant additives (see Modern Plastics Encyclopedia, Vo. 50, No. 10A, Oct. 1973, pgs. 232–236, incorporated by reference herein). The tetrazole salts will then provide a resin foam which will char at flame temperatures to create a flame-retardant, char-form, insulating layer. However, as an intumescent agent, the ultimate product will have undecomposed water-insoluble metallic salts of 5-phenyl tetrazoles therein during normal use period, and which salts decompose on exposure to openflame or high-heat conditions to foam the product and protect the product against heat. Our compounds are particularly useful in, first, not being decomposed at a low temperature such as to trigger a premature release of gas when exposed to a high temperature, but only on open-flame or high direct heat conditions. Products containing our metallic salts of 5-phenyl tetrazole may be placed in contact with water or laundered in alkali soaps and detergents without immediate loss of the intumescent agent.

In addition to the above, our metallic salts are useful as intumescent agents in intumescent-type paints; for example, but not limited to, their use as intumescent agents in latex-type base intumescent paints, such as in additive amounts of 0.1 to 5.0% by weight of the resin in acrylic, polyvinyl, rubber-based and other resin-aqueous paints. Our metal salt compounds may be used in aqueous latex-type paints because of the high stability of the compounds in an aqueous medium, as well as the high temperatures of decomposition. In addition to the use of intumescent painting compositions, our compounds may be used in mastics or mastic-type products by being coated, sprayed or extruded onto a surface, such as structural steel.

What we claim is:

1. A process of producing an expanded thermoplastic polymer having a processing temperature of greater than about 500°F, which process comprises:
    a. incorporating into the polymer a blowing amount of a metal salt of a tetrazole having the formula:

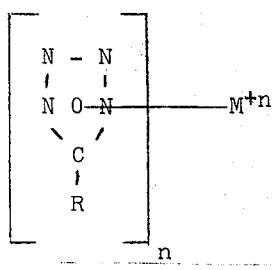

wherein R is a phenyl radical or an alkyl, halogen or 5-tetrazoylsubstituted phenyl radical,
wherein $n$ is 2 or 3, and
wherein M is metal selected from the group of barium, calcium, zinc, lead and aluminum; and
    b. heating the polymer containing such metal salt tetrazole to a temperature sufficient to decompose the tetrazole.

2. The process of claim 1 wherein the tetrazole is zinc di (5-phenyl tetrazole).

3. The process of claim 1 wherein the tetrazole is barium di (5-phenyl tetrazole).

4. The process of claim 1 wherein the tetrazole is calcium di (5-phenyl tetrazole).

5. The process of claim 1 wherein the polymer is selected from the group consisting of polycarbonate, polysulfone, polysulfonate, polyphenyl oxide, polyamides, polyaryl ether, polyphenylene sulfide, poly-p-oxybenzoate and polyester polymers.

6. The process of claim 1 wherein the blowing amount is from about 0.1 to 5.0% by weight of the polymer.

7. The process of claim 1 which includes heating the polymer to a temperature of from about 500° to 750°F to decompose the blowing agent.

8. The process of producing an expanded polycarbonate polymer, which process comprises:
    a. incorporating in the polycarbonate polymer having a compounding melt temperature of about 400° to 550°F from 0.1 to 5.0% by weight of a metal salt of a 5-phenyl tetrazole, the salt selected from the group of metals of barium, calcium, lead, zinc and aluminum; and
    b. heating the polycarbonate containing the incorporated metal salt to a temperature of from 500° to 750°F and sufficient to decompose the metal salt of the tetrazole, and to provide an expanded polycarbonate polymer.

9. A flame-retardant synthetic textile material which comprises a plurality of fibers composed of a polymeric material containing a flame-retardant additive, which fibers also contain an intumescent amount of a metal salt of a mono or bis tetrazole, the metal salt selected from the group of metals of barium, calcium, zinc, lead and aluminum, the salt decomposing to provide nitrogen gas and a foam-like char material when the fibers are exposed to a temperature in excess of about 500°F.

10. A flame-retardant paint composition which comprises an aqueous-base latex polymeric paint composition which contains an intumescent amount of a metal salt of a mono or bis tetrazole, the metal salt selected from the group of metals of barium, calcium, zinc, lead and aluminum, the salt compound resistant to hydrolysis and water-insoluble, the salt providing for the release of nitrogen gas and the formation of a foam char-type material when the dried latex paint coating is exposed to a temperature of more than about 500°F.

11. The process of claim 1 which includes, after incorporating and prior to heating, the step of forming the polymer with the metal salts of the tetrazole therein at a temperature less than the decomposition temperature of the tetrazole into foamable pellets.

12. The process of claim 1 which includes, after incorporating and prior to heating, the step of forming the polymer with the metal salts of the tetrazole therein at a temperature less than the decomposition temperature of the tetrazole into a foamable textile fiber.

13. The process of claim 12 wherein the polymer contains a flame-retardant additive.

14. The process of claim 1 which includes, after incorporating and prior to heating, the step of dispersing the polymer with the metal salts of the tetrazole into a latex solution.

15. An expandable polymer composition which comprises:
    a. an expandable thermoplastic polymer having a processing temperature of greater than about 500°F; and
    b. a blowing amount of a metal salt of a tetrazole having the formula

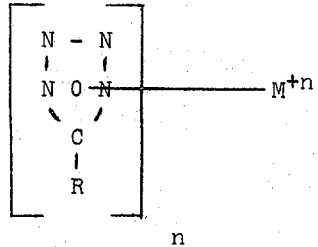

wherein R is a phenyl radical or an alkyl, halogen or 5-tetrazoylsubstituted phenyl radical,
wherein $n$ is 2 or 3, and
wherein M is metal selected from the group of barium, calcium, zinc, lead and aluminum.

16. The polymer composition of claim 15 wherein the polymer is selected from the group consisting of polycarbonate, polysulfone, polysulfonate, polyphenyl oxide, polyamides, polyaryl ether, polyphenylene sulfide, poly-p-oxybenzoate and polyester polymers.

17. The polymer composition of claim 15 wherein the processing temperature of the polymer is from about 500° to 750°F.

18. The polymer composition of claim 15 wherein the polymer is foamable pellets or fibers.

* * * * *